United States Patent
VanEaton et al.

(10) Patent No.: US 7,372,649 B2
(45) Date of Patent: May 13, 2008

(54) APPARATUS AND METHOD FOR APPLYING WRITE SIGNALS FOR DRIVING A WRITE HEAD

(75) Inventors: Thomas Cougar VanEaton, Wylie, TX (US); Bryan E. Bloodworth, Irving, TX (US); Glenn Mayfield, Garland, TX (US); Tuan Van Ngo, Eden Prairie, MN (US)

(73) Assignee: Texas Instruments Incorporated, Dallas, TX (US)

(*) Notice: Subject to any disclaimer, the term of this patent is extended or adjusted under 35 U.S.C. 154(b) by 165 days.

(21) Appl. No.: 10/407,011

(22) Filed: Apr. 3, 2003

(65) Prior Publication Data

US 2004/0196581 A1    Oct. 7, 2004

(51) Int. Cl.
  *G11B 5/09* (2006.01)
  *G11B 5/02* (2006.01)
(52) U.S. Cl. .................. 360/46; 360/68; 327/108; 327/110
(58) Field of Classification Search .................. 360/60, 360/66, 67, 68; 327/107, 108, 110; 324/210, 324/212
  See application file for complete search history.

(56) References Cited

U.S. PATENT DOCUMENTS

| | | | |
|---|---|---|---|
| 5,781,046 A * | 7/1998 | Ngo et al. .................. 327/110 |
| 5,880,626 A * | 3/1999 | Dean .......................... 327/110 |
| 6,175,463 B1 * | 1/2001 | Nayebi et al. ................. 360/68 |
| 6,246,533 B1 * | 6/2001 | Davis et al. ................... 360/68 |
| 6,285,221 B1 * | 9/2001 | Leighton et al. ............. 327/110 |
| 6,301,068 B1 * | 10/2001 | Ionescu ........................ 360/68 |
| 6,373,298 B1 * | 4/2002 | Teterud et al. .............. 327/110 |
| 6,388,476 B1 * | 5/2002 | Isobe et al. ................. 327/110 |
| 6,504,666 B1 * | 1/2003 | Patti et al. .................... 360/68 |
| 6,512,645 B1 * | 1/2003 | Patti et al. .................... 360/46 |
| 6,512,646 B1 * | 1/2003 | Leighton et al. .............. 360/46 |
| 7,006,313 B2 * | 2/2006 | Ngo ............................. 360/46 |
| 7,280,300 B1 * | 10/2007 | Aram et al. ................... 360/68 |
| 2004/0032682 A1 * | 2/2004 | Leighton et al. .............. 360/66 |
| 2004/0070862 A1 * | 4/2004 | Ranmuthu .................... 360/68 |
| 2004/0257688 A1 * | 12/2004 | Nakamura .................... 360/46 |

\* cited by examiner

*Primary Examiner*—Andrea Wellington
*Assistant Examiner*—Dan I Davidson
(74) *Attorney, Agent, or Firm*—Tum Thach; Wade J. Brady, III; Frederick J. Telecky, Jr.

(57) ABSTRACT

An apparatus for use in applying write signals for driving a write head to effect writing information to a memory device; the write signals including a first write signal and a second write signal; includes: (a) a directing circuit receiving the write signals, directing a current to establish a voltage across the write head in a first excursion toward a first polarity in response to the first write signal and directing the current to establish the voltage across the write head in a second excursion toward a second polarity substantially opposite the first polarity in response to the second write signal; (b) a first boost system coupled with the directing circuit and boosting the write voltage toward the first polarity during the first excursion; and (c) a second boost system coupled with the directing circuit and boosting the write voltage toward the second polarity during the second excursion.

19 Claims, 4 Drawing Sheets

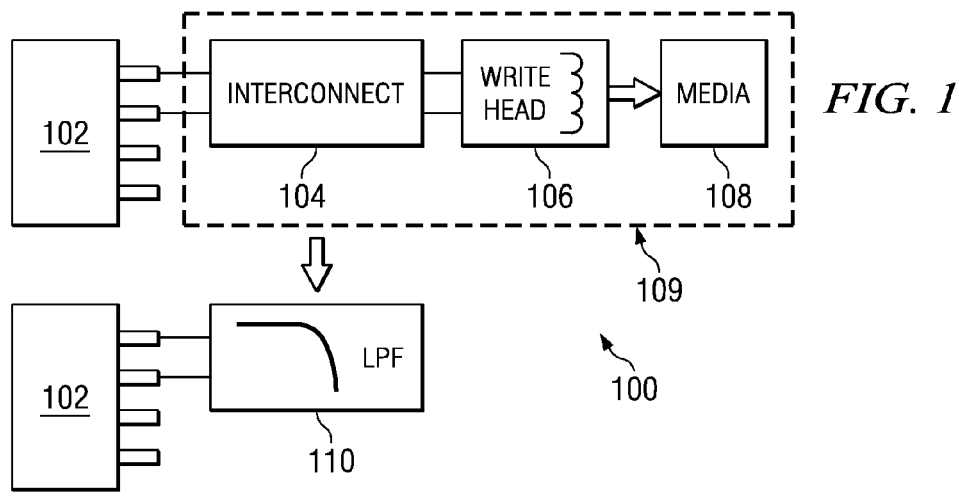
*FIG. 1*
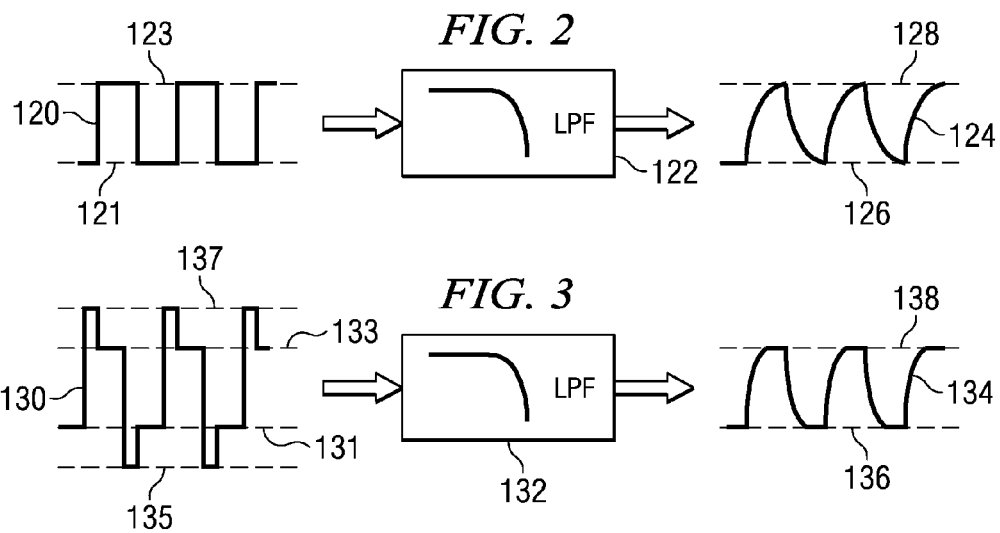
*FIG. 2*
*FIG. 3*
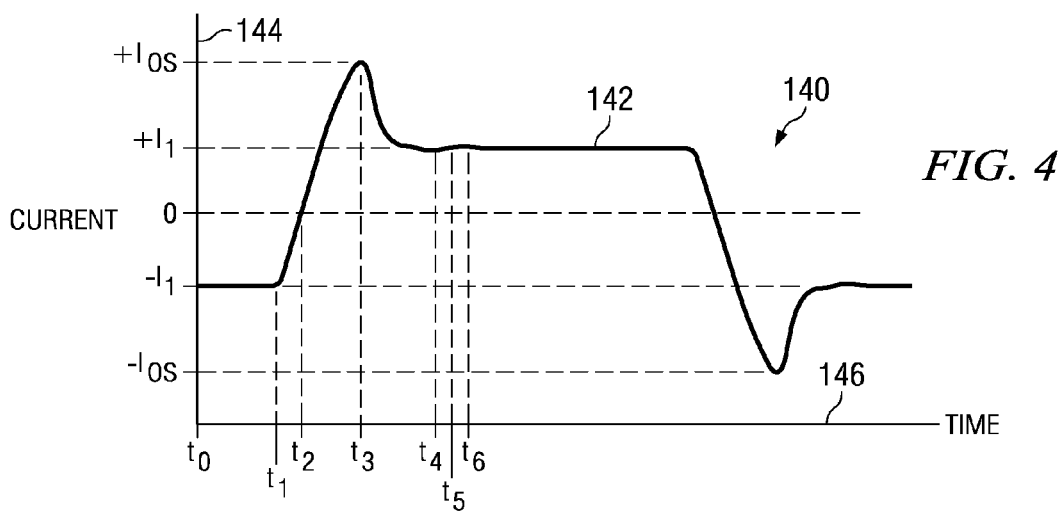
*FIG. 4*

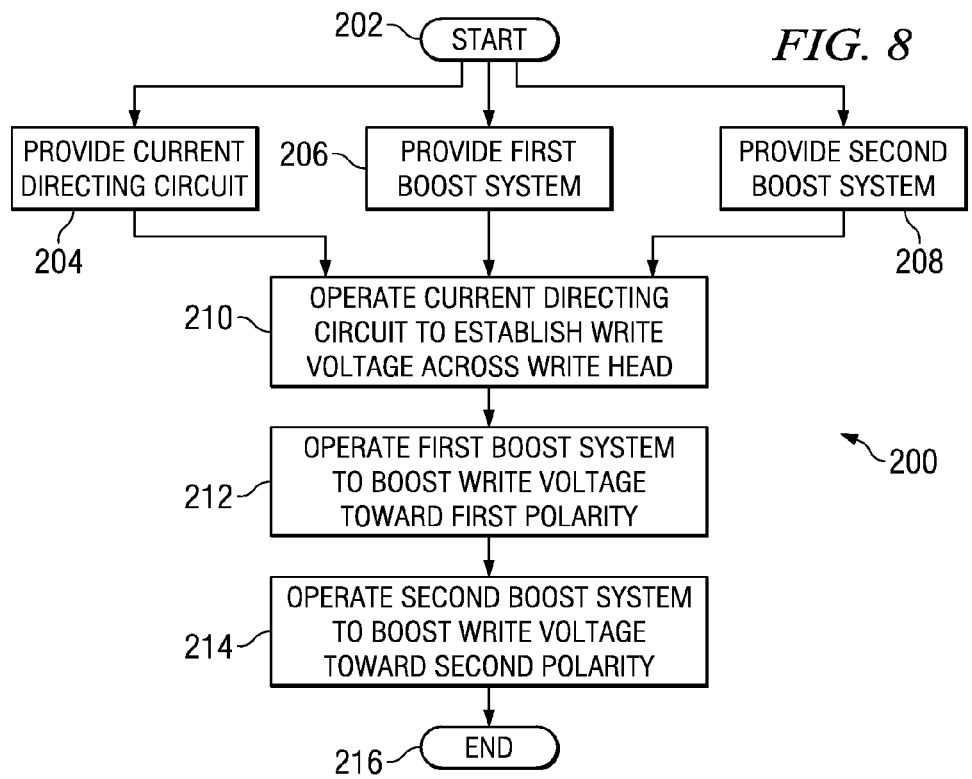
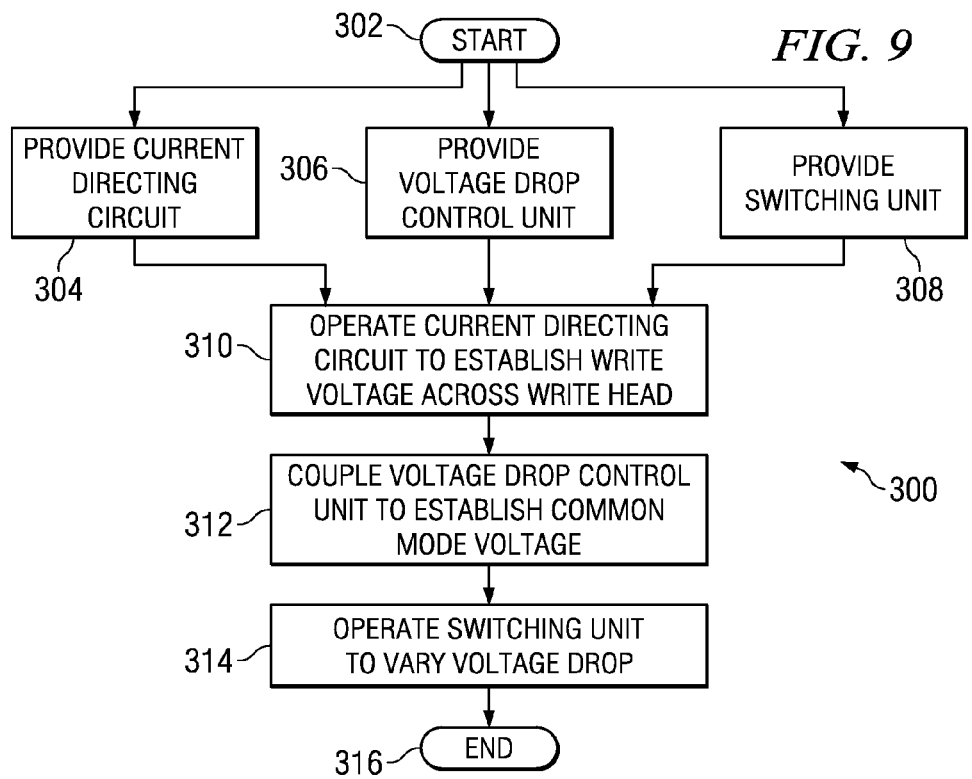

APPARATUS AND METHOD FOR APPLYING WRITE SIGNALS FOR DRIVING A WRITE HEAD

CROSS REFERENCE TO RELATED APPLICATIONS

The present application is related to U.S. patent application No. 10/407,025 entitled "Apparatus and Method for Applying Write Signals for Driving a Write Head,"filed Apr. 3, 2003, which is assigned to the current assignee hereof.

BACKGROUND OF THE INVENTION

The present invention is directed to write driving apparatuses and methods associated with memory devices. In particular, the present invention is directed to a preamplifier apparatus for use with a differential write driver for a hard disk drive (HDD) storage device. The present invention is especially useful with a thin film inductive write driver.

The interconnecting leads between preamplifiers and read/write heads in hard disk drive devices are spaced very close together, often within a few mils of each other. The read sensors consist of very sensitive magnetoresistive material that cannot tolerate excessive voltages. In contrast, the write element consists of a thin-film inductor which requires large sub-nanosecond voltage swings for high data rate systems. Because of the close spacing of the writer and the reader, an asymmetrical voltage swing provided to the write head can couple into and damage the adjacent read element.

Manufacturers of preamplifier devices often provide their products to numerous customer-users. Each customer-user may have its own specifications for a preamplifier used in its particular end products. A manufacturer that can manufacture a single part to accommodate the demands of numerous customer-users can obtain significant economies of scale in manufacturing and other advantages by manufacturing a single multi-use part.

There is a need for an apparatus and method for use in applying write signals for driving a write head to effect writing information to a memory device that can accommodate a range of operating requirements for a variety of customer-user end products.

SUMMARY OF THE INVENTION

An apparatus for use in applying write signals including a first and second write signal for a write head to write information to a memory device includes: (a) a current director for receiving the write signals and directing a write current to establish a write voltage across the write head in a first excursion in response to the first write signal and in a second excursion in response to the second write signal; the first and second excursions occurring about a common mode voltage; (b) a voltage drop unit coupled with a supply voltage and the current director at a connection locus for establishing the common mode voltage substantially equal with the supply voltage less a voltage drop; and (c) a switching unit coupled with the voltage drop unit and the connection locus and cooperating with the voltage drop unit to vary the voltage drop.

A method for applying write signals including a first and second write signal for driving a write head to effect writing information to a memory device includes the steps of: (a) in no particular order: (1) providing a current directing circuit; the current directing circuit receiving the write signals; (2) providing a voltage drop control unit coupled with a supply voltage; and (3) providing a switching unit coupled with the voltage drop control unit and with the current detecting circuit; (b) operating the current directing circuit to direct a write current to establish a write voltage across the write head in a first excursion toward a first polarity in response to the first write signal and to direct the write current to establish the write voltage across the write head in a second excursion toward a second polarity substantially opposite the first polarity in response to the second write signal; the first excursion and the second excursion occurring about a common mode voltage; (c) coupling the voltage drop control unit with the current directing circuit at a connection locus to establish the common mode voltage substantially equal with the supply voltage less a voltage drop; and (d) operating the switching unit in cooperation with the voltage drop unit to vary the voltage drop.

It is, therefore an object of the present invention to provide an apparatus and method for use in applying write signals for driving a write head to effect writing information to a memory device that can accommodate a range of operating requirements for a variety of customer-user end products.

Further objects and features of the present invention will be apparent from the following specification and claims when considered in connection with the accompanying drawings, in which like elements are labeled using like reference numerals in the various figures, illustrating the preferred embodiments of the invention.

BRIEF DESCRIPTION OF THE DRAWINGS

FIG. 1 is a schematic diagram illustrating modeling of a thin film inductive write driver system as a low pass filter.

FIG. 2 is a schematic diagram illustrating how a low pass filter affects traversing signals.

FIG. 3 is a schematic diagram illustrating how a signal overshoot affects the operation of a low pass filter.

FIG. 4 is a graphic plot illustrating a desired write current waveform as a function of time.

FIG. 8 is a flow chart illustrating the preferred embodiment of the method for boosting write voltages according to the present invention.

FIG. 9 is a flow chart illustrating the preferred embodiment of the method for varying common mode voltage according to the present invention.

DETAILED DESCRIPTION OF THE PREFERRED EMBODIMENT

Figure 5:
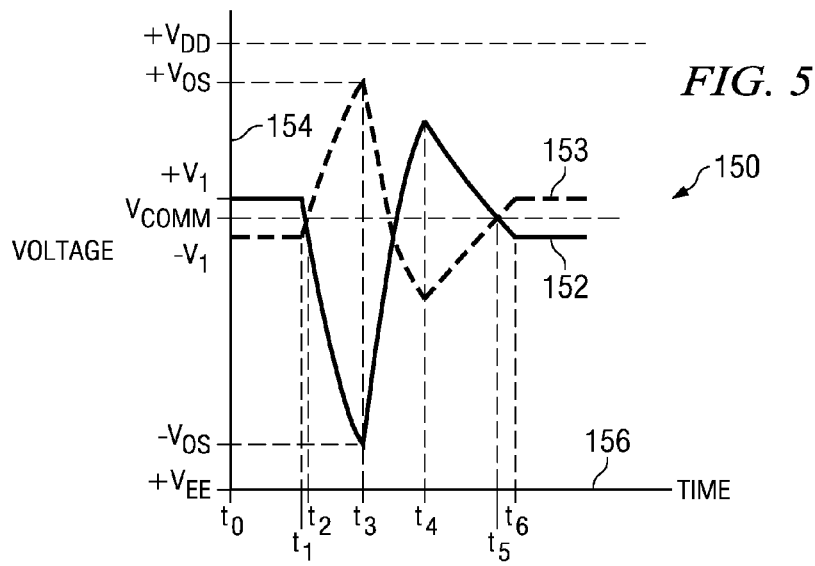
FIG. 5 is a graphic plot illustrating voltage characteristics across a write head as a function of time that are appropriate for presenting the desired current waveform illustrated in FIG. 4.

Prior art apparatuses for use in applying write signals for driving a write head to effect writing information to a memory device, such as write driver preamplifiers, are often not designed to effect symmetrical voltage swing during the write current reversal period. Write current reversal is commonly employed to differentiate between digital symbols (e.g., a "1" and a "0") in writing information to a memory device. Any voltage asymmetry in carrying out write current reversal will result in energy coupling into the adjacent reader(s), and can damage or destroy the sensitive read element(s). Read elements and write elements are commonly situated in very close proximity in read/write heads associated with storage mediums such as hard disk drive (HDD) devices. The coupling current can be modeled by:

$$I = C\frac{dV}{dt} \quad [1]$$

Where, C is the average capacitance from the writer to the reader, dV is the asymmetrical voltage, and dt is the net change in time.

From Eqn. [1] one can observe that the coupling current will increase when the spacing between traces is decreased ((i.e., when capacitance is increased), when the writer voltage is asymmetric (i.e., when dV is increased), or when the switching speed is increased (i.e., when dt is decreased).

FIG. 1 is a schematic diagram illustrating modeling of a thin film inductive write driver system as a low pass filter. In FIG. 1, a write driver system 100 includes a preamplifier 102 coupled with an interconnect structure 104. Interconnect structure 104 typically includes lead wires extending from preamplifier 102 along an extended arm reaching adjacent a magnetic storage disk (not shown in FIG. 1) to a write head 106. Write head 106 is typically suspended on the extended arm that supports interconnect structure 104 in close proximity with media 108. Media 108 is typically a magnetic storage disk.

Components contained within dotted line box 109 may be modeled as a low pass filter (LPF) 110 coupled with preamplifier 102. Low pass filter 110 is configured to pass signals having frequencies below a predetermined frequency value and inhibit passing of signals having frequencies above the predetermined frequency value.

FIG. 2 is a schematic diagram illustrating how a low pass filter affects traversing signals. In FIG. 2, an input signal 120 is input to a low pass filter 122. Input signal 120 varies between an input signal minimum 121 and an input signal maximum 123. Low pass filter 122 presents an output signal 124. Output signal 124 has a relatively slow rise time from output signal minimum 126 and output signal maximum 128. Similarly, output signal 124 has a relatively slow fall time from output signal maximum 128 to output signal minimum 126. Slow rising and falling result in transitions or excursions of output signal 124 between output signal minimum 126 and output signal maximum 128 occupying longer time intervals than would be the case if rise times and fall times were steeper. If signal transitions or excursions occurred more quickly, more data could be transferred in a given time interval than can be transferred when rise times and fall times are slower.

FIG. 3 is a schematic diagram illustrating how a signal overshoot affects the operation of a low pass filter. In FIG. 3, an input signal 130 is input to a low pass filter 132. An overshoot characteristic is introduced to input signal 130 so that input signal 130 varies between an input signal minimum 135 and an input signal maximum 137. Input signal limits 135, 137 are beyond the nominal signal limits 131, 133 that would be associated with input signal 130 without an overshoot characteristic imposed. Low pass filter 132 presents an output signal 134. Output signal 134 has a relatively faster rise time (compared with rise time for output signal 124; FIG. 2) from output signal minimum 136 and output signal maximum 138. Similarly, output signal 134 has a relatively faster fall time (compared with rise time for output signal 124; FIG. 2) from output signal maximum 138 to output signal minimum 136. Faster rising and falling result in transitions or excursions of output signal 134 between output signal minimum 136 and output signal maximum 138 occupying shorter time intervals. Because signal transitions or excursions occur more quickly, more data can be transferred in a given time interval than can be transferred when rise times and fall times are slower.

Faster rising and falling of signals to a write head in a storage system is manifested in increased density of stored bits. Write systems therefore preferably provide current overshoot characteristics to aid in quickly reversing current direction through a write head to reverse flux direction intersected by the storage medium (e.g., a magnetic disk) for writing information to the storage medium (e.g., "1"s and "0"s). Providing current overshoot characteristics also sharpens transition edges, thereby permitting reliable increased density writing of information to the storage medium.

FIG. 4 is a graphic plot illustrating a desired write current waveform as a function of time. In FIG. 4, a graphic plot 140 presents a curve 142 representing current through a write head is plotted according to a first (current) axis 144 as a function of time according to a second axis 146. Curve 142 begins at a time to at a current level of $-I_1$. Current level $-I_1$ is a current level that indicates a digital character (e.g., a "1" or a "0") for storage in a medium such as a magnetic storage disk (not shown in FIG. 4). At a time $t_1$ curve 142 increases and passes zero at a time $t_2$. Curve 142 continues to increase until it reaches a value of $+I_{OS}$ at a time $t_3$. Current level $+I_{OS}$ is the positive overshoot current limit or peak overshoot of curve 142. Curve 142 rapidly declines in value after time $t_3$ and approaches a current level $+I_1$. Curve 142 settles out at current level $+I_1$ substantially at time $t_6$. Current level $+I_1$ is a current level that indicates a digital character (e.g., a "1" or a "0") for storage in a medium such as a magnetic storage disk (not shown in FIG. 4). Subsequently, the curve 142 decreases and passes zero and continues to decrease until it reaches a value of $-I_{OS}$. Current level $-I_{OS}$ is the negative overshoot current limit or peak undershoot of curve 142. Curve 142 then rapidly increases in value and and approaches a current level $-I_1$. Curve 142 settles out at current level $-I_1$. Preferably curve is symmetrical so that there is no net positive or negative current. That is, preferably magnitude $|+I_{OS}|$ is equal with magnitude $|-I_{OS}|$.

FIG. 5 is a graphic plot illustrating voltage characteristics across a write head as a function of time that are appropriate for presenting the desired current waveform illustrated in FIG. 4. In FIG. 5, a graphic plot 150 presents curves 152, 153 representing voltages present at respective connection terminals of a write head that provide the desired write currents (e.g., curve 140; FIG. 4). Curves 152, 153 are plotted according to a first (voltage) axis 154 as a function of time according to a second axis 156. Curve 152 represents voltage present at a first terminal of a write head and begins at a time to at a voltage level of $+V_1$. Curve 153 represents voltage present at a second terminal of the write head and begins at a time $t_0$ at a voltage level of $-V_1$. Curves 152, 153 represent voltage potentials at each of two ends of a write head that cooperate to establish a current through the write head (e.g., curve 140; FIG. 4). At a time $t_1$ curve 152 decreases and passes zero at a time $t_2$. At a time $t_1$ curve 153 increases and passes zero at time $t_2$. Polarity of the current through the write head is determined by polarities of voltages at terminals of the write head. Thus, current through the write head will proceed in a first direction (i.e., have a first polarity) when curve 152 is at potential $+V_1$ and curve 153 is at potential $-V_1$ as during the interval $t_0$–$t_2$. The relative polarities of curves 152, 153 during interval $t_0$–$t_2$ will produce a write current, for example, of $-I_1$ as indicated during interval $t_0$–$t_1$ in FIG. 4.

Curve 152 continues to decrease until it reaches a value of $-V_{OS}$ at a time $t_3$. Curve 153 continues to increase until it reaches a value of $+V_{OS}$ at time $t_3$. Voltage level $-V_{OS}$ is the negative overshoot voltage limit of curve 152. Voltage level $+V_{OS}$ is the positive overshoot voltage limit of curve 153. During the interval $t_2$–$t_3$ current (e.g., curve 140; FIG. 4) through the write head moves from zero to $+I_{OS}$. Curve 152 rapidly increases in value after time $t_3$ and reaches a maximum excursion locus at time $t_4$. Curve 153 decreases in value after time $t_3$ and reaches a minimum excursion locus at time $t_4$. Current through the write head has passed its peak overshoot current limit (either $+I_{OS}$ or $-I_{OS}$, depending upon the relative polarities of curves 152, 153) during the interval $t_3$–$t_4$.

Curve 152 decreases after time $t_4$ and settles out at voltage $-V_1$ at time $t_6$. Curve 153 increases after time $t_4$ and settles out at voltage $+V_1$ at time $t_6$. Peak undershoot of current through the write head occurs at time $t_5$ when curves 152, 153 cross. Current through the write head during interval $t_0$–$t_1$ flows in the opposite direction of current through the write head following time $t_6$ because the relative polarities of curves 152, 153 are reversed during those times.

During interval $t_0$–$t_1$ and after time $t_6$ curves 152, 153 are substantially symmetrical about a common mode voltage $V_{COMM}$. It is preferred that voltage represented by curve 152 ($V_{152}$) and voltage represented by curve 153 ($V_{153}$) be symmetrical about common mode voltage $V_{COMM}$ so that preferably magnitude $|V_{152}|$ is equal with magnitude $|V_{153}|$ in any selected time interval. When such symmetry is achieved, coupling between components in a write system (e.g., coupling with adjacent read elements) may be avoided.

Sometimes a system is skewed toward the top rail (also referred to as upper supply voltage; e.g., $V_{DD}$ in FIG. 5) or toward the bottom rail (also referred to as lower supply voltage; e.g., $V_{EE}$ in FIG. 5) and "runs out of room" in its signal variance while seeking desired symmetry. This sometimes occurs because common mode voltage $V_{COMM}$ (i.e., the common voltage about which the signal variations are desired to be symmetrical) is too high or too low. When common mode voltage $V_{COMM}$ is too close to the top rail, for example, a system may tend to generate voltages that encounter the top rail, limiting the magnitude of signal excursion in the positive direction (while not affecting signal excursions in the negative direction), thereby experiencing asymmetry. Similarly, one may find that common mode voltage $V_{COMM}$ is skewed toward a lower value so that a system tends to generate voltages that encounter the bottom rail and thereby experience asymmetry.

A manufacturer of a preamplifier for use with a read-write storage system (e.g., a magnetic disk storage system) preferably designs a preamplifier that can accommodate a variety of operating conditions and parameters that may be presented by different system designs by different customers. Accordingly it is advantageous for a given preamplifier design to have programmable bottom end characteristics—such as programmable magnitude and programmable duration of boost toward a negative direction for a voltage waveform for a writer head. Similarly, it is advantageous for a given preamplifier to have programmable top end characteristics—such as programmable magnitude and programmable duration of boost toward a positive direction for a voltage waveform for a writer head. Having both top and bottom boost programmable permits a preamplifier to accommodate a wide range of operating characteristics that may be encountered in various storage systems in which the preamplifier may be employed. In order to design a device that can be used with a variety of products for a variety of customers, it is advantageous for a system to provide some adjustability to a customer in designing what value is assigned for common mode voltage $V_{COMM}$. It is advantageous for a system to provide a capability to adjust the value of common mode voltage $V_{COMM}$ to permit a designer to ensure that sufficient room is left to avoid crowding the top rail or the bottom rail during operation.

Figure 6:
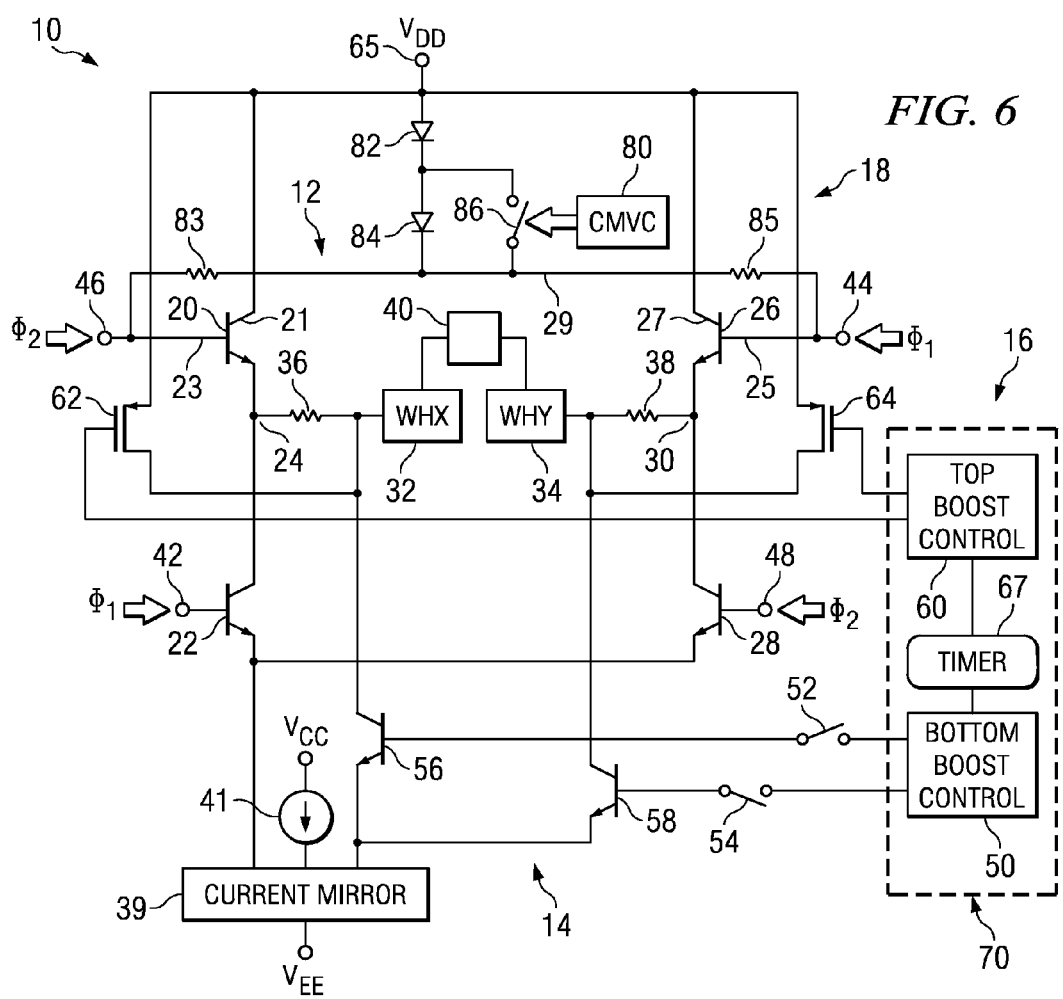
FIG. 6 is a simplified schematic diagram illustrating the preferred embodiment of the apparatus of the present invention.

FIG. 6 is a simplified schematic diagram illustrating the preferred embodiment of the apparatus of the present invention. In FIG. 6, a preamplifier apparatus 10 includes an H-bridge circuit 12, a bottom boost control system 14, a top boost control system 16 and a common mode voltage control system 18.

H-bridge circuit 12 includes transistors 20, 22 coupled at a first common locus 24, and transistors 26, 28 coupled at a second common locus 30. Write head connection loci 32, 34 are coupled in series with bias resistors 36, 38. Write head 40 is coupled between write head connection loci 32, 34. A first supply voltage $V_{DD}$ (the upper rail) is applied to transistor 20 at its collector 21 and is applied to transistor 26 at its collector 27. A second supply voltage $V_{EE}$ (the lower rail) is applied to transistors 22, 28 via a current source preferably embodied in a current mirror 39 (not shown in detail in FIG. 6). Current mirror 39 has a reference current source 41.

When a first write signal $\Phi_1$ is applied to input loci 42, 44 transistors 22, 26 are turned on and current flows from second common locus 30 through write head 40 to first common locus 24 (An example of the current flow through write head 40 is illustrated in curve 140; FIG. 4). This situation may exist, for example, when a write signal establishes a positive voltage excursion across write head connection loci 32, 34 (see curve 153; FIG. 5). When a second write signal $\Phi_2$ is applied to input loci 46, 48 transistors 20, 28 are turned on and current flows from first common locus 24 through write head 40 to second common locus 30. This situation may exist, for example, when a write signal establishes a negative excursion across write head connection loci 32, 34 from common mode voltage (see curve 152; FIG. 5). It is the alternate application of write signals $\Phi_1$, $\Phi_2$ that effects writing of data to a hard disk in a disk drive storage device.

Bottom boost control system 14 includes a bottom boost control unit 50, switches 52, 54 and transistors 56, 58. In order to enhance negative excursion of a first write voltage WHX (e.g., curve 152; FIG. 5) bottom boost control unit 50 closes switch 52, thereby turning on transistor 56 to conduct. Switch 54 is open so that transistor 58 does not conduct. Rendering transistor 56 conductive applies additional current from current mirror 39 to lower potential at write connection locus 32. The lowered potential at write connection locus 32 pulls down the first write voltage WHX, thereby boosting the bottom characteristic of the first write voltage WHX. That is, negative excursion of first write voltage WHX is enhanced by bottom boost system 14. In order to enhance negative excursion of a second write voltage WHY (e.g., curve 153; FIG. 5) bottom boost control unit 50 closes switch 54, thereby turning on transistor 58 to conduct. Switch 52 is open so that transistor 56 does not conduct. Rendering transistor 58 conductive applies additional current from current mirror 39 to lower potential at write connection locus 34. The lowered potential at write connection locus 34 pulls down second write voltage WHY, thereby boosting the bottom characteristic of second write voltage WHY. That is, the negative excursion of second write voltage WHY is enhanced by bottom boost system 14.

It is important to have write voltage signals (e.g., write voltages WHX, WHY; FIG. 6) experience balanced excursions from their common mode voltage in order to reduce coupling with adjacent read elements (not shown in FIG. 6). Top boost control system 16 is provided to assist in providing such symmetry in excursions of write signals in preamplifier apparatus 10. Top boost control system 16 includes a top boost control unit 60 and transistors 62, 64. In order to enhance positive excursion of first write voltage WHX top boost control unit 60 gates transistor 62 to conduct. Transistor 64 is not gated and therefore does not conduct. Rendering transistor 62 conductive applies first supply voltage $V_{DD}$ (the top rail) to raise potential at write connection locus 32. The raised potential at write connection locus 32 pulls up first write voltage WHX toward first supply voltage $V_{DD}$, thereby boosting the top characteristic of first write voltage WHX. That is, the positive excursion of first write voltage WHX is enhanced by top boost system 16. In order to enhance positive excursion of second write voltage WHY top boost control unit 60 gates transistor 64 to conduct. Transistor 62 is not gated and therefore does not conduct. Rendering transistor 64 conductive applies first supply voltage $V_{DD}$ (the top rail) to raise potential at write connection locus 34. The raised potential at write connection locus 34 pulls up second write voltage WHY toward first supply voltage $V_{DD}$, thereby boosting the top characteristic of second write voltage WHY. That is, the positive excursion of second write voltage WHY is enhanced by top boost system 16.

The strength, or magnitude of the bottom boost provided by bottom boost system 14 may be adjusted by varying current provided by current mirror 39. The strength, or magnitude of the top boost provided by top boost system 16 may be adjusted by adding impedance or other voltage dropping elements between transistors 62, 64 and first voltage supply locus 65. Increasing voltage drop between first voltage supply locus 65 and transistors 62, 64 provides a lesser magnitude boost. In a preferred embodiment of preamplifier apparatus 10 (not shown in FIG. 6) impedances or other voltage dropping elements between transistors 62, 64 and first voltage supply locus 65 may be selectively switchably engaged so that the amount of voltage drop between transistors 62, 64 and first voltage supply locus 65 is adjustable by a user-designer. The maximum boost that can be applied, in theory, is to the level of first supply voltage $V_{DD}$.

The duration of the bottom boost provided by bottom boost system 14 may be adjusted by bottom boost control unit 50 in its controlling of transistors 56, 58. The duration of the top boost provided by top boost system 16 may be adjusted by top boost control unit 60 unit in its controlling of transistors 62, 64.

Symmetry in write signaling involves assuring substantial symmetry in magnitude of positive and negative signal excursions and involves assuring substantial symmetry in duration of boost signals urging signals toward positive or toward negative values. Symmetry of duration may be provided to write signals when being treated by bottom boost system 14 and top boost system 16 in an alternate embodiment of the apparatus of the invention by operating bottom boost system 14 and top boost system 16 using a common timer, such as timer 67. Alternatively, bottom boost system 14 and top boost system 16 may be embodied in a unified boost control system 70, as indicated by dotted line in FIG. 6. Using such a unified boost control system 70 provides a common boost signal from a single boost signal source and affects employment of the single boost signal as a top boost signal or as a bottom boost signal by switchingly engaging the common boost signal to first selected circuit loci for one function (e.g., to transistor 62 or to transistor 64 for top boost) and other to second selected circuit loci for another function (e.g., to switch 52 or to switch 54 for bottom boost). Such a unified boost control system or such a common timer may cause preamplifier apparatus 10 to be less power efficient than other embodiments of the invention. Further, by automatically assuring symmetry of duration of boost signals one reduces the adaptability of preamplifier apparatus 10 to accommodate various operating conditions imposed by designer-users. If magnitude symmetry cannot be attained, one may wish to design asymmetrical write signal durations to allow for magnitude asymmetry. In such circumstances, automatic enforcement of duration symmetry may not be desired.

It is useful to be able to adjust common mode voltage in preamplifier apparatus 10 in order to avoid experiencing topping out at the top rail in positive excursions of write signals. Common mode voltage control system 18 includes a common mode voltage control (CMVC) unit 80, diodes 82, 84 and a switch 86. The employment of two diodes is representative only and a different number of diodes or other voltage dropping elements is within the intended scope of the invention. When switch 86 is open, diodes 82, 84 introduce two diode voltage drops between first voltage supply locus 65 and H-bridge circuit 12 at bases 23, 25 of transistors 20, 26 via resistors 83, 85. In such a configuration, the common mode voltage provided to H-bridge circuit 12 at bases 23, 25 of transistors 20, 26 is first supply voltage $V_{DD}$, less two diode voltage drops. Common mode voltage control system 18 can adjust the common mode voltage provided to H-bridge circuit 12 at bases 23, 25 of transistors 20, 26 by closing switch 86, thereby bypassing diode 84 and coupling diode 82 directly to bases 23, 25 of transistors 20, 26. In that configuration, with switch 86 closed, the common mode voltage provided to H-bridge circuit 12 at bases 23, 25 of transistors 20, 26 is first supply voltage $V_{DD}$, less one diode voltage drop. In such manner, common mode voltage may be raised by a designer-user; greater positive excursions may be experienced by write signals when switch 86 is open because common mode voltage is lower (i.e., first supply voltage $V_{DD}$, less two diode voltage drops). Employing more diodes and more switches in common mode voltage control system 18 top provides more granularity in adjusting common mode voltage of preamplifier system 10.

Figure 7:
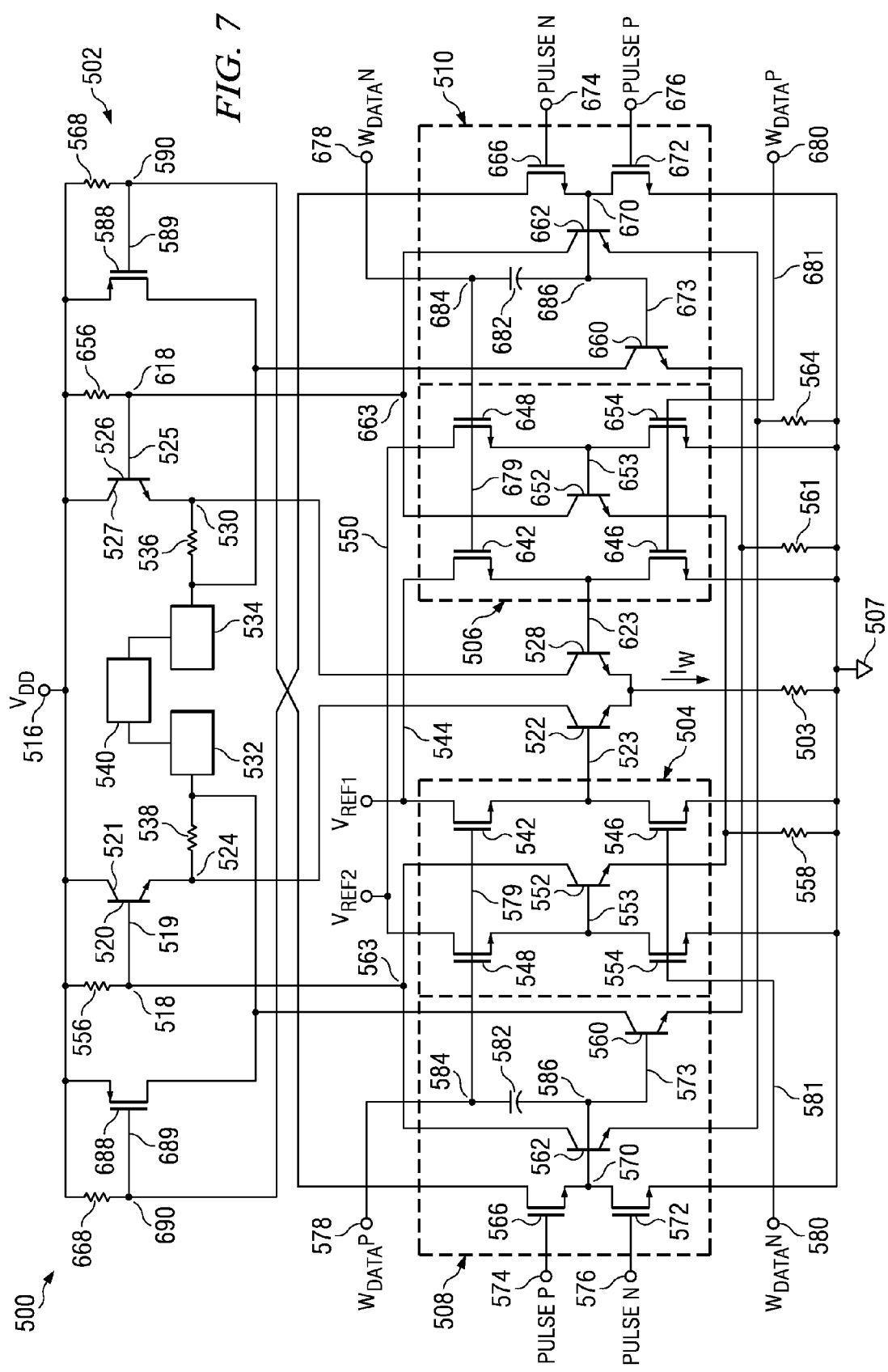
FIG. 7 is a simplified schematic diagram illustrating an alternate embodiment of the apparatus of the present invention.

FIG. 7 is a simplified schematic diagram illustrating an alternate embodiment of the apparatus of the present invention. In FIG. 7, a preamplifier apparatus 500 includes an H-bridge circuit 502, a first switch control system 504, a second switch control system 506, a first boost control system 508 and a second boost control system 510.

H-bridge circuit 502 includes transistors 520, 522 coupled between a first common locus 524 and a first supply voltage input locus 516, and transistors 526, 528 coupled between a second common locus 530 and first supply voltage input locus 516. First supply voltage input locus 516 receives a first supply voltage at a first supply voltage level $V_{DD}$. Write head connection loci 532, 534 are coupled in series with resistors 536, 538. Write head 540 is coupled between write head connection loci 532, 534. First supply voltage $V_{DD}$ (the upper rail) is applied via a resistor 556 to transistor 520 at its base 519. First supply voltage $V_{DD}$ is applied via a resistor 656 to transistor 526 at its base 525. A second supply voltage (the lower rail; established as ground 507 in FIG. 7) is applied to transistors 522, 528 via a bias resistor 503.

First switch control system 504 includes a transistor 542 coupled between a first reference line 544 and base 523 of transistor 522. First switch control system 504 further includes a transistor 546 coupled between base 523 and ground 507. First switch control system 504 also includes a transistor 548 coupled between a second reference line 550 and a base 553 of a transistor 552. First switch control system 504 also includes a transistor 554 coupled between base 553 and ground 507. Transistor 552 is also included in first switch control system 504 and is coupled in series with resistors 556, 558 between first supply voltage input locus 516 and ground 507. Base 519 of transistor 520 is connected at a connection locus 518 between resistor 556 and transistor 552.

First boost control system 508 includes a transistor 560 coupled between write head connection locus 532 and ground 507 via a resistor 561. First boost control system 508 further includes a transistor 562 coupled between a connection locus 563 (between resistor 556 and transistor 552) and ground 507 via a resistor 564. First boost control system 508 also includes a transistor 566 coupled between first supply voltage input locus 516 via a resistor 568 and a connection locus 570. First boost control system 508 also includes a transistor 572 coupled between connection locus 570 and ground 507. A gating signal PULSE P is applied to an input locus 574 for controlling gating of transistor 566. A gating signal PULSE N is applied to an input locus 576 for controlling gating of transistor 572. A write signal $W_{DATA}$ P is applied at an input locus 578 for controlling gating of transistors 542, 548 via a gating signal line 579. A write signal $W_{DATA}$ N is applied at an input locus 580 for controlling gating of transistors 546, 554 via a gating signal line 581. A signal line 573 is connected at connection locus 570 for controlling operation of transistors 560, 562. A capacitor 582 is coupled with gating signal line 579 at a connection locus 584 between transistor 548 and input locus 578. Capacitor 582 is also coupled with signal line 573 at a connection locus 586 between transistors 560, 562. A transistor 588 is coupled between first supply voltage input locus 516 and write head connection locus 534. Transistor 588 is gated by a gating signal line 589 connected with a connection locus 590 between resistor 568 and transistor 566.

Second switch control system 506 includes a transistor 642 coupled between first reference line 544 and base 623 of transistor 528. Second switch control system 506 further includes a transistor 646 coupled between base 523 and ground 507. Second switch control system 506 also includes a transistor 648 coupled between second reference line 550 and a base 653 of a transistor 652. Second switch control system 506 also includes a transistor 654 coupled between base 553 and ground 507. Transistor 652 is also included in second switch control system 506 and is coupled in series with resistors 656, 558 between first supply voltage input locus 516 and ground 507. Base 525 of transistor 526 is connected at a connection locus 618 between resistor 656 and transistor 652.

Second boost control system 510 includes a transistor 660 coupled between write head connection locus 534 and ground 507 via resistor 561. Second boost control system 510 further includes a transistor 662 coupled between a connection locus 663 (between resistor 656 and transistor 652) and ground 507 via a resistor 564. Second boost control system 510 also includes a transistor 666 coupled between first supply voltage input locus 516 via a resistor 668 and a connection locus 670. Second boost control system 510 also includes a transistor 672 coupled between connection locus 670 and ground 507. Gating signal PULSE N is applied to an input locus 674 for controlling gating of transistor 666. Gating signal PULSE P is applied to an input locus 676 for controlling gating of transistor 672. Write signal $W_{DATA}$ N is applied at an input locus 678 for controlling gating of transistors 642, 648 via a gating signal line 679. Write signal $W_{DATA}$ P is applied at an input locus 680 for controlling gating of transistors 646, 654 via a gating signal line 681. A signal line 673 is connected at connection locus 670 for controlling operation of transistors 660, 662. A capacitor 682 is coupled with gating signal line 679 at a connection locus 684 between transistor 648 and input locus 678. Capacitor 682 is also coupled with signal line 673 at a connection locus 686 between transistors 660, 662. A transistor 688 is coupled between first supply voltage input locus 516 and write head connection locus 532. Transistor 688 is gated by a gating signal line 689 connected with a connection locus 690 between resistor 668 and transistor 666.

First reference line 544 carries a reference voltage $V_{REF1}$. Second reference line 550 carries a reference voltage $V_{REF2}$. Preferably reference voltages $V_{REF1}$, $V_{REF2}$ are generated from a +5 volt supply and are referenced to ground. Reference voltage $V_{REF1}$ is used to set the amplitude of the output write current $I_w$ of preamplifier apparatus 500. Reference voltage $V_{REF2}$ sets the pull-down current going through the collector of transistor 552. Preferably, reference voltage $VREF_2$ is proportional to reference voltage $V_{REF1}$ so that optimum performance is achieved for various values of write current $I_w$.

Switching of write data provided by write signals $W_{DATA}$ P, $W_{DATA}$ N is effected by transistors 542, 546, 548, 554 and by transistors 642, 646, 648, 654. For example, when write signal $W_{DATA}$ P is high (e.g., +5 volts) and write signal $W_{DATA}$ N is low (e.g., 0 volts), transistors 542, 548 are on, thereby connecting transistors 522, 552 with reference voltages $V_{REF1}$, $V_{REF2}$ and turning on transistors 522, 552. At the same time transistors 646, 654 turn off transistors 528, 652. In that configuration write current $I_w$ will pass from transistor 526 through resistor 536, through write head 540, through resistor 538 and through transistor 522 to ground 507. In that configuration, transistor 552 is also on and pulls down base 519 of transistor 520 to a voltage less than the potential of the base of transistor 526. Preferably, transistor 520 remains biased on with a small current proportional to write current $I_w$ (e.g., about $I_w/10$) in order to present a matched differential impedance to the external connection at first supply voltage locus 516 of about 80 ohms.

Pulsing gating signals PULSE P, PLULSE N is effected to achieve boosting of write current $I_w$ in order to create fast rise time and high overshoot through write head 540. A low side or bottom boost is carried out using transistors 560, 562, 660, 662. For example, when write signal $W_{DATA}$ P switches from low to high, pulsing or gating signal PULSE P also produces a positive pulsing from 0 volts to 5 volts. Gating signal PULSE P is delayed in time relative to write signal $W_{DATA}$ P and has a short pulse width (i.e., it is a pulse having a short time interval). The short pulse interval causes transistors 560, 562 to turn on and quickly pull down the base of transistor 520 and the output signal at write head connection locus 532. By cumulating currents through transistors 552, 562 (at connection locus 563) a very fast current change with high overshoot is accomplished. Capacitors 582, 682 aid in effecting fast transitions. When one of boost control systems 508, 510 is turning on, the associated capacitor 582, 682 aids in fast turning on. The other of boost control systems 508, 510 turns off when one boost system turns on. The associated capacitor 582, 682 associated in the turning off boost control system aids quickness of turning off. That is, capacitors 582, 682 help in creating faster rise times for write current $I_w$ when turning on and effect quicker turning off when write current $I_w$ reverses. For example, when write signal $W_{DATA}$ P switches high, the bases of transistors 560, 562 are also switched high because of the capacitive coupling effect of capacitor 582. Then gating signal PULSE P will produce a positive current pulse adding to the rising edge of current through transistors 522, 552. This condition yields a fast, smooth and high overshoot write current $I_w$.

At the same time, in the exemplary situation described, write head connection locus 534 is pulled high by gating transistor 588 to connect write head connection locus 534 with first supply voltage locus 516. By using gating signal PULSE P (in the exemplary configuration) to gate transistor 588, potential on gating signal line 589 is pulled down fast and transistor 58 is therefore turned on hard, pulling up write head connection locus 534 quickly.

Second switch control system 506 and second boost control system 510 operate in substantially similar fashion when write data switches in the opposite direction than that present in the exemplary configuration so that write signal $W_{DATA}$ P is low (e.g., 0 volts) and write signal $W_{DATA}$ N is high (e.g., +5 volts).

FIG. 8 is a flow chart illustrating the preferred embodiment of the method of the present invention. In FIG. 8, a method 200 is illustrated for applying write signals for driving a write head to effect writing information to a memory device. The write signals include a first write signal and a second write signal. Method 200 begins at a START locus 202 and continues with the steps of, in no particular order: (1) providing a current directing circuit for receiving the write signals, as indicated by a block 204; (2) providing a first boost system coupled with the current directing circuit, as indicated by a block 206; and (3) providing a second boost system coupled with the current directing circuit, as indicated by a block 208.

Method 200 continues with the step of operating the current directing circuit to direct a write current to establish a write voltage across the write head in a first excursion toward a first polarity in response to the first write signal and to direct the write current to establish the write voltage across the write head in a second excursion toward a second polarity substantially opposite the first polarity in response to the second write signal, as indicated by a block 210.

Method 200 continues with the step of operating the first boost system to boost the write voltage toward the first polarity during the first excursion, as indicated by a block 212. Method 200 continues with the step of operating the second boost system to boost the write voltage toward the second polarity during the second excursion, as indicated by a block 214. Method 200 then terminates, as indicated by an END locus 216.

FIG. 9 is a flow chart illustrating the preferred embodiment of the method for varying common mode voltage according to the present invention. In FIG. 9, a method 300 is illustrated for applying write signals for driving a write head to effect writing information to a memory device. The write signals including a first write signal and a second write signal. Method 300 begins at a START locus 302 and continues with the steps of, in no particular order: (1) providing a current directing circuit for receiving the write signals, as indicated by a block 304; (2) providing a voltage drop control unit coupled with a supply voltage, as indicated by a block 306; and (3) providing a switching unit coupled with the voltage drop control unit and with the current detecting circuit, as indicated by a block 308.

Method 300 continues with the step of operating the current directing circuit to direct a write current to establish a write voltage across the write head in a first excursion toward a first polarity in response to the first write signal and to direct the write current to establish the write voltage across the write head in a second excursion toward a second polarity substantially opposite the first polarity in response to the second write signal, as indicated by a block 310. The first excursion and the second excursion occur about a common mode voltage.

Method 300 continues with the step of coupling the voltage drop control unit with the current directing circuit at a connection locus to establish the common mode voltage substantially equal with the supply voltage less a voltage drop, as indicated by a block 312. Method 300 continues with the step of operating the switching unit in cooperation with the voltage drop unit to vary the voltage drop, as indicated by a block 314. Method 300 then terminates, as indicated by an END locus 316.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

We claim:

1. An apparatus for use in applying write signals for driving a write head to effect writing information to a memory device, the write signals including a first write signal and a second write signal, the apparatus comprising:
   (a) a current directing circuit receiving said write signals, said current directing circuit directing a write current to establish a write voltage between a first locus and a second locus across said write head that results in voltage at said first locus changing toward a first polarity in response to said first write signal and voltage at said second locus changing toward a second polarity substantially opposite the first polarity in response to said first write signal;
   (b) a first boost system coupled with said current directing circuit and said first locus, said first boost system boosting voltage at said first locus toward said first polarity so that a resultant current through said write head substantially overshoots a resultant current through said write head when boosting of said voltage at said first locus is terminated;
   (c) a second boost system coupled with said current directing circuit and said second locus, said second boost system boosting voltage at said second locus toward said second polarity so that a resultant current through said write head substantially overshoots a resultant current through said write head when boosting of said voltage at said second locus is terminated; and
   wherein said first boost system is responsive to a first boost system control unit, wherein said second boost system is responsive to a second boost system control unit, and wherein said first boost system control unit operates independently of said second boost system control unit.

2. An apparatus for use in applying write signals for driving a write head to effect writing information to a memory device as recited in claim 1 wherein said first boost system urges said first locus toward ground potential and wherein said second boost system urges said second locus toward a positive supply voltage.

3. An apparatus for use in applying write signals for driving a write head to effect writing information to a memory device as recited in claim 1 wherein said first boost system control unit controls a duration during which said first boost system is active and said second boost system control unit controls a duration during which said second boost system is active.

4. An apparatus for use in applying write signals for driving a write head to effect writing information to a memory device as recited in claim 1 wherein at least one of said first boost system and said second boost system raises electrical potential at a particular locus of said first locus and said second locus for a first time interval and lowers electrical potential at the other locus of said first locus and said second locus for a second time interval, said second time interval being longer than said first time interval, said second time interval spanning said first time interval.

5. An apparatus for use in applying write signals for driving a write head to effect writing information to a memory device as recited in claim 4 wherein said first boost system control unit controls the first time interval and said second boost system control unit controls the second time interval.

6. An apparatus for use in applying write signals for driving a write head to effect writing information to a memory device as recited in claim 4 wherein said first boost system urges said first locus toward a negative supply voltage and wherein said second boost system urges said second locus toward a positive supply voltage.

7. An apparatus for use in applying write signals for driving a write head to effect writing information to a memory device as recited in claim 6 wherein said first time interval and said second time interval are substantially equal.

8. An apparatus for use in applying write signals for driving a write head to effect writing information to a memory device as recited in claim 1 wherein said apparatus further includes a common mode voltage control system, wherein the common mode voltage control system is operable to selectively adjust a common mode voltage level applied to the current directing circuit.

9. An apparatus for use in applying write signals for driving a write head to effect writing information to a memory device as recited in claim 8 wherein said common mode voltage control system includes a plurality of diodes that are configured to be selectively bypassed by a switch circuit.

10. A method for applying write signals for driving a write head to effect writing information to a memory device, said write signals including a first write signal and a second write signal, the method comprising:
 (a) In no particular order:
  (1) providing a current directing circuit; said current directing circuit receiving said write signals;
  (2) providing a first boost system coupled with said current directing circuit;
  (3) providing a second boost system coupled with said current directing circuit; and
  (4) providing a first boost system control unit and a second boost system control unit;
 (b) operating said current directing circuit to direct a write current to establish a write voltage between a first locus and a second locus across said write head that results in voltage at said first locus changing toward a first polarity in response to said first write signal and voltage at said second locus changing toward a second polarity substantially opposite the first polarity in response to said first write signal;
 (c) operating said first boost system to boost said voltage at said first locus toward said first polarity so that a resultant current through said write head substantially overshoots a resultant current through said write head when boosting of said voltage at said first locus is terminated;
 (d) operating said second boost system to boost said voltage at said second locus toward said second polarity so that a resultant current through said write head substantially overshoots a resultant current through said write head when boosting of said voltage at said second locus is terminated; and
 (e) operating said first boost system control unit to control said first boost system and operating said second boost system control unit to control said second boost system, wherein said first boost system control unit is operated separately from said second boost system control unit.

11. A method for applying write signals for driving a write head to effect writing information to a memory device as recited in claim 10 wherein said first boost system urges said first locus toward a negative supply voltage and wherein said second boost system urges said second locus toward a positive supply voltage.

12. A method for applying write signals for driving a write head to effect writing information to a memory device as recited in claim 10 wherein said first boost system control unit controls a first duration during which said first boost system is active and said second boost system control unit controls a second duration during which said second boost system is active.

13. A method for applying write signals for driving a write head to effect writing information to a memory device as recited claim 10 wherein at least one of said first boost system and said second boost system raises electrical potential at a particular locus of said first locus and said second locus for a first time interval and lowers electrical potential at the other locus of said first locus and said second locus for a second time interval, said second time interval being longer than said first time interval, said second time interval spanning said first time interval.

14. A method for applying write signals for driving a write head to effect writing information to a memory device as recited in claim 13 wherein said first boost system control unit controls said first time interval and said second boost system control unit controls said second time interval.

15. A method for applying write signals for driving a write head to effect writing information to a memory device as recited in claim 14 wherein said first time interval and said second time interval are substantially equal.

16. A method for applying write signals for driving a write head to effect writing information to a memory device as recited in claim 15 wherein said first time interval and said second time interval are substantially contemporaneous.

17. An apparatus for use in applying write signals for driving a write head to effect writing information to a memory device, said write signals including a first write signal and a second write signal, the apparatus comprising:
 (a) a current directing circuit, receiving said write signals, said current directing circuit directing a write current to establish a write voltage between a first locus and a second locus across said write head that results in voltage at said first locus changing toward a first polarity in response to said first write signal and voltage at said second locus changing toward a second polarity substantially opposite the first polarity in response to said first write signal;

(b) a first boost system coupled with said current directing circuit and said first locus, said first boost system boosting voltage at said first locus toward said first polarity so that a resultant current through said write head substantially overshoots a resultant current through said write head when boosting of said voltage at said first locus is terminated;

(c) a second boost system coupled with said current directing circuit and said second locus, said second boost system boosting voltage at said second locus toward said second polarity so that a resultant current through said write head substantially overshoots a resultant current through said write head when boosting of said voltage at said second locus is terminated; and (d) a common mode voltage control system, wherein the common mode voltage control system is operable to selectively adjust a common mode voltage level applied to the current directing circuit.

18. An apparatus for use in applying write signals for driving a write head to effect writing information to a memory device as recited in claim 17 wherein said first boost system is responsive to a first boost system control unit, wherein said second boost system is responsive to a second boost system control unit, and wherein said first boost system control unit operates independently of said second boost system control unit.

19. An apparatus for use in applying write signals for driving a write head to effect writing information to a memory device as recited in claim 17 wherein said common mode voltage control system includes a plurality of diodes that are configured to be selectively bypassed by a switch circuit.

* * * * *